United States Patent
Marupaduga et al.

(10) Patent No.: US 10,667,193 B1
(45) Date of Patent: May 26, 2020

(54) BALANCING TRAFFIC IN A HETEROGENEOUS NETWORK WITH ACTIVE DISTRIBUTED ANTENNA SYSTEM

(71) Applicant: Sprint Spectrum LP, Overland Park, KS (US)

(72) Inventors: Sreekar Marupaduga, Overland Park, KS (US); Saravana Velusamy, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 32 days.

(21) Appl. No.: 15/612,308

(22) Filed: Jun. 2, 2017

(51) Int. Cl.
*H04W 36/22* (2009.01)
*H04W 36/08* (2009.01)
*H04L 12/26* (2006.01)

(52) U.S. Cl.
CPC ........... *H04W 36/22* (2013.01); *H04L 43/028* (2013.01); *H04W 36/08* (2013.01)

(58) Field of Classification Search
CPC ...... H04W 36/08; H04W 36/22; H04L 43/028
See application file for complete search history.

(56) References Cited

U.S. PATENT DOCUMENTS

| | | | |
|---|---|---|---|
| 9,071,985 B2 * | 6/2015 | Garavaglia | H04W 28/0268 |
| 9,351,172 B2 | 5/2016 | Thiel et al. | |
| 10,045,314 B2 * | 8/2018 | Stapleton | H04W 88/085 |
| 10,225,785 B2 * | 3/2019 | Chincholi | H04L 5/0048 |
| 2007/0121542 A1 * | 5/2007 | Lohr | H04L 47/10 370/329 |
| 2015/0358959 A1 * | 12/2015 | Meshkati | H04W 72/0413 370/329 |
| 2017/0034857 A1 * | 2/2017 | Berggren | H04L 61/2007 |
| 2017/0242565 A1 * | 8/2017 | MacKinney | H04W 28/24 |

* cited by examiner

*Primary Examiner* — Rhonda L Murphy

(57) ABSTRACT

Methods and systems for balancing traffic in a wireless network by controlling DAS and an access node of a macro nodes to direct a wireless device to the system with the lowest latency, according to a priority of an application of a wireless device. The method includes receiving an indicator of an application type, or a bearer type, from a wireless device, determining a processing delay of a distributed antenna system, determining a priority of the received signal, and in response to the processing delay of the distributed antenna system meeting a first criteria and a quality of service indicator meeting a second criteria, directing the wireless device to an access node.

20 Claims, 5 Drawing Sheets

US 10,667,193 B1

BALANCING TRAFFIC IN A HETEROGENEOUS NETWORK WITH ACTIVE DISTRIBUTED ANTENNA SYSTEM

TECHNICAL BACKGROUND

As wireless networks evolve, the demand for high-quality service to a growing number of wireless devices or users increases. Distributed Antenna Systems (DAS) may be deployed indoors and outdoors to provide improved wireless access to end users. However, there may be processing delays (e.g., latency) with active DAS systems where RF signals are converted to digital signals. This conversion process may add significant delay to the system. In most DAS this delay may be compensated, but it may still be higher as compared to a macro network. Traffic load may also increase processing delays. Thus, delay sensitive applications may be impacted.

OVERVIEW

Embodiments described herein include methods and systems for balancing traffic in a wireless network by controlling DAS and an access node of a macro nodes to direct a wireless device to the system with the lowest latency, according to a priority of an application of a wireless device. An embodiment of the following description includes a method for balancing traffic in a wireless network. The method includes receiving an indicator of an application type, or a bearer type, from a wireless device, determining a processing delay of a distributed antenna system, determining a priority of the received signal, and in response to the processing delay of the distributed antenna system meeting a first criteria and a quality of service indicator meeting a second criteria, directing the wireless device to an access node.

Another embodiment of the following description includes a method for controlling a distributed antenna system. The method includes receiving a latency condition of an access node, receiving an application type from a wireless device, determining a quality of service indicator of the received signal, determining a latency condition of the distributed antenna system, comparing the latency condition of the access node to the latency condition of the distributed antenna system, and in response to the latency of the distributed antenna system being greater than the latency of the access node and the quality of service indicator meeting a criteria, redirect the wireless device to the access node.

According to an embodiment, the following description includes a wireless network system including a distributed antenna system having a first latency and an access node having a second latency. The distributed antenna system is configured to receive an application indicator of a wireless device, determine a quality of service indicator from the received signal, monitor the first latency and the second latency, compare the first latency to the second latency, redirect the wireless device to the access node in response to the first latency being greater than the second latency and the quality of service indicator meeting a criteria.

DETAILED DESCRIPTION

According to embodiments described herein, distributed antenna systems (DAS) redirects a wireless device to a macro cell based on a priority of an application type of the wireless device and latencies of the DAS and an access node of a macro cell. The priority may be based on the sensitivity of the application type to processing delays or latency at the DAS or access node. The priority may be indicated by the wireless device application type's quality of service (QoS) indicator. Based on the received wireless device application type's QoS indicator or by looking at received packets, the DAS may determine whether the received application type has a high priority. For example, voice calls, video chat, video conferencing, or online gaming may be application types sensitive to processing delays or latency and, thus, may have QoS indicators indicating high priority. For example, internet browsing, email messaging, text messaging may not have high priority. In response to determining the QoS indicates a high priority, the DAS may scan for an access node of macro cell having a lower processing delay or latency. Alternatively, the network may look at received packets to determine the application type's priority. For example, the network may look at the packets using deep packet inspection performed by packet sniffers within the network. For example, the network may output the priority of the application type to the DAS. The DAS or network may compare the latency of an access node of macro cell found in the scan operation, to the latency of the DAS. In response to the access node's latency being less than the DAS latency, the DAS or network redirects the wireless device to the access node of the macro cell having a lower latency.

The determination for redirection of the wireless device may be based on loading conditions. For example, a DAS may determine to redirect the wireless in response to a determination that an access node of a macro cell has less load. For example, the access node of the macro cell load is less than a load on the DAS.

Figure 1:
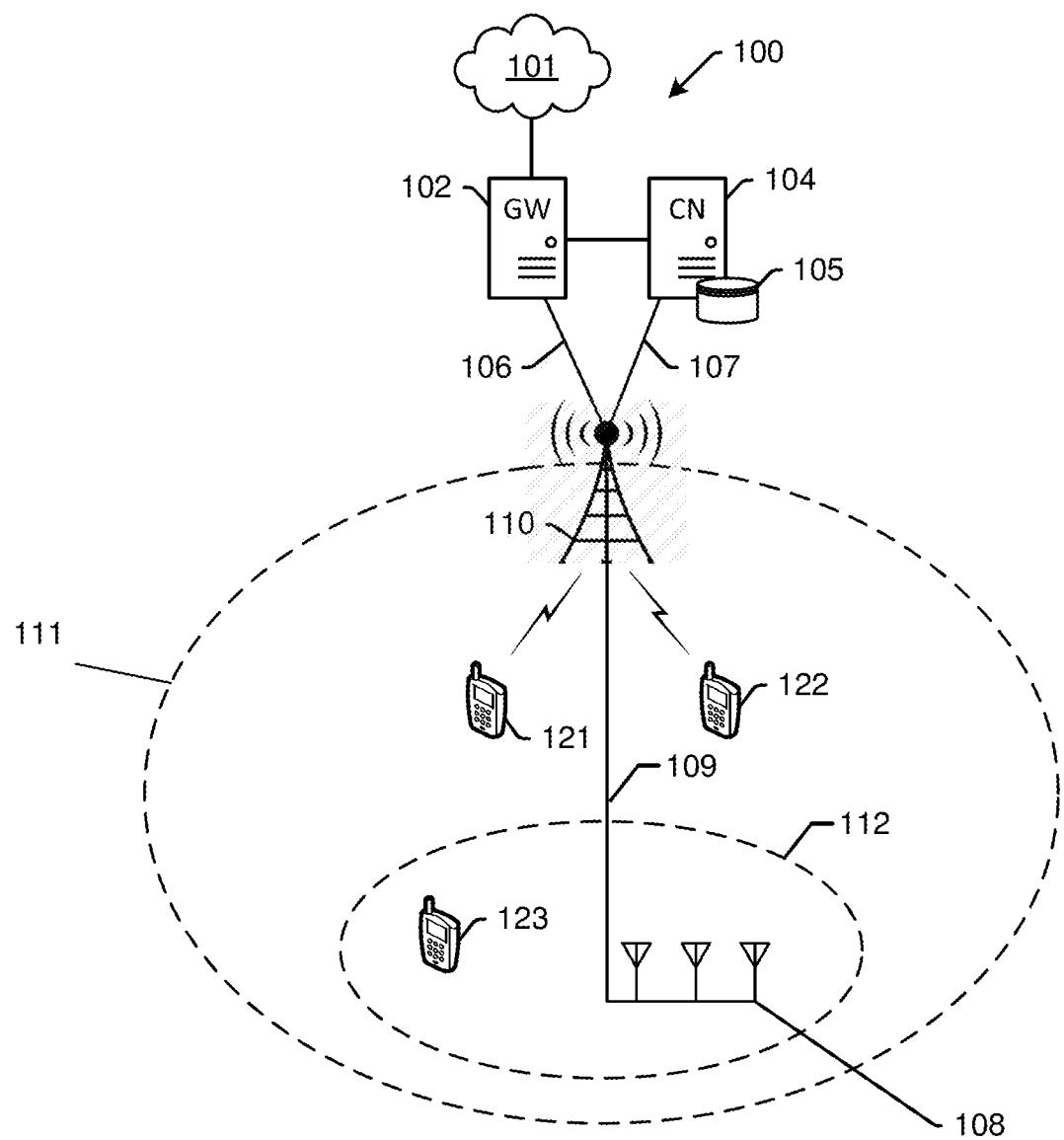
FIG. 1 is a diagram illustrating a system for controlling an access node according to an embodiment.

FIG. 1 depicts a system 100 for transmitting cell-specific reference signals. System 100 comprises a communication network 101, gateway 102, controller node 104, access node 110, an antenna system 108, and wireless devices 121-123. Access node 110 is illustrated as having a coverage area 111, with wireless devices 121-123 being located within coverage area 111 and wireless devices 121 and 122 accessing network services from access node 110. The antenna system 108 has a coverage area 112 within the access node coverage area 111. The antenna system 108 coverage area 112 may overlap the access node coverage area 111. For example, wireless device 123 may access network services from the access node 110, the antenna system 108, or both.

Access node 110 can be any network node configured to provide communication between end-user wireless devices 121-123 and communication network 101, including standard access nodes and/or short range, low power, small access nodes. For instance, access node 110 may include any standard access node, such as a macrocell access node, base transceiver station, a radio base station, an eNodeB device, an enhanced eNodeB device, or the like. In an embodiment, a macrocell access node can have a coverage area 111 in the range of approximately five kilometers to thirty-five kilometers and an output power in the tens of watts. In other embodiments, access node 110 can be a small access node including a microcell access node, a picocell access node, a femtocell access node, or the like such as a home NodeB or a home eNodeB device.

Antenna system 108 may comprise any configuration of antennas or access points configured to provide wireless devices (e.g., wireless device 123) access to a communication network (e.g., communication network 101) within a geographic area. For example, antenna system 108 may comprise a distributed antenna system (DAS) or any other suitable configured antenna system or array distributed across a predetermined geographic space or within a building (i.e., indoors). In some embodiments, antenna system 108 may comprise one or more filters (e.g., low pass filters), one or more repeaters, one or more amplifiers, and any other suitable components.

Access node 110 and antenna system 108 can each comprise a processor and associated circuitry to execute or direct the execution of computer-readable instructions to perform operations such as those further described herein. Briefly, access node 110 and antenna system 108 can each retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 and antenna system 108 can receive instructions and other input at a user interface. Access node 110 communicates with gateway node 102 and controller node 104 via communication links 106, 107. Antenna system 108 communicates with gateway node 102 and controller node 104 via communication links 106, 107, and 109. Access node 110 and antenna system 108 may each communicate with other access nodes (not shown) using a direct link such as an X2 link or similar.

Wireless devices 121-123 may be any device, system, combination of devices, or other such communication platform capable of communicating wirelessly with access node 110 or antenna system 108 using one or more frequency bands deployed therefrom. Wireless devices 121-123 may be, for example, a mobile phone, a wireless phone, a wireless modem, a personal digital assistant (PDA), a voice over internet protocol (VoIP) phone, a voice over packet (VOP) phone, or a soft phone, a computing platform such as a laptop, palmtop, or a tablet, relay communication device, or an internet access device, and combinations thereof. It is noted that while three wireless devices are illustrated in FIG. 1 as being in communication with the depicted access as well as other types of devices or systems that can exchange audio or data via access node 110 or antenna system 108. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 121-123 etc. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

In operation, access node 110 may establish communication with wireless devices 121-123 such that access node 110 provides the wireless devices access to a communication network (e.g., communication network 101). Antenna system 108 may establish communication with wireless device 123 such that antenna system 108 provides the wireless devices access to a communication network (e.g., communication network 101). In an embodiment, system 100 may use a plurality of carriers in order to provide wireless communication services. For example, a plurality of carriers comprise bandwidth for wireless communications, for example, one or more carriers over a 2.5 GHz spectrum, a 1.25 GHz spectrum, a 1900 MHz spectrum, an 800 MHz spectrum, and the like. The carriers may include a plurality of channels, for example, 5 MHz channels, 10 MHz channels, 15 MHz channels, and the like, that may further be divided into subcarriers. In an embodiment, a frequency band may comprise a carrier, a channel, a subcarrier, a plurality of any of these, or any other suitable frequency band.

Communication links 106, 107, 109 can use various communication media, such as air, space, metal, optical fiber, twisted pair cable, coaxial cable or some other signal propagation path, including combinations thereof. Communication links 106, 107, 109 can be wired or wireless and use various communication protocols such as Internet, Internet protocol (IP), local-area network (LAN), optical networking, hybrid fiber coax (HFC), telephony, T1, or some other communication format, including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communications links 106, 107, 109 may include Si communications links. Other wireless protocols can also be used. Communication links 106, 107, 109 can be a direct link or might include various equipment, intermediate components, systems, and networks. Communication links 106, 107, 109 may comprise many different signals sharing the same link Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a packet data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to wireless devices 121-123, such as control information, location, etc. This information may be requested by or shared with access node 110 and antenna system 108 via connections 106, 107, 109, X2 connections, and so on. The software comprises computer programs, firmware, or some other form of machine-readable instructions, and may include an operating system, utilities, drivers, network interfaces, applications, or some other type of software, and combinations thereof. Controller node 107 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101 or antenna system 108 and communication network 101.

Figure 2:
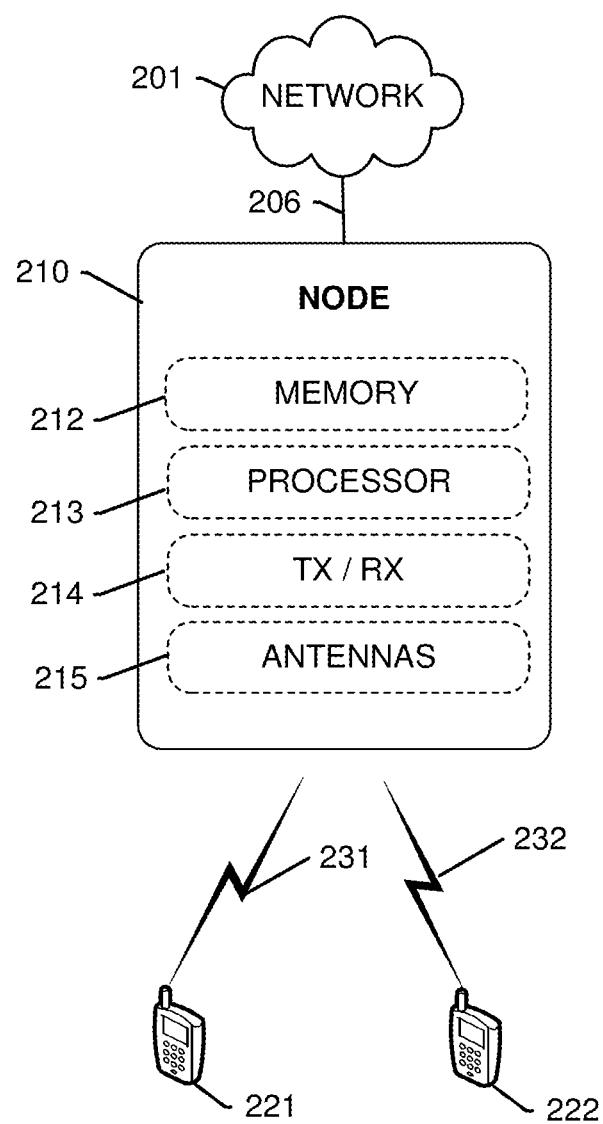
FIG. 2 is a diagram illustrating a node according to an embodiment.

FIG. 2 depicts an example of a node 210 for allocating resources in a wireless network. Node 210 may be representative of access node 110 or antenna system 108 of FIG. 1, however embodiments are not limited thereto. Node 210 is configured as an access point for providing network services from network 201 to end-user wireless devices 221, 222 via communication links 231, 232 respectively. Wireless devices 231 and 231 may be representative of wireless devices 121-123 of FIG. 1 however, embodiments are not limited thereto. Node 210 is illustrated as comprising a memory 212 for storing logical modules that perform operations described herein, a processor 213 for executing the logical modules, and a transceiver 214 for transmitting and receiving signals via antennas 215. One or more antennas ports may connect the antennas 215 to the transceiver 214. Although only one transceiver is depicted in node 210, additional transceivers may be incorporated in order to deploy MIMO modes with wireless devices 221, 222, and to facilitate communication with other network nodes on network 201. Further, node 210 is communicatively coupled to network 201 via communication interface 206, which may be any wired or wireless link as described above.

Figure 3:
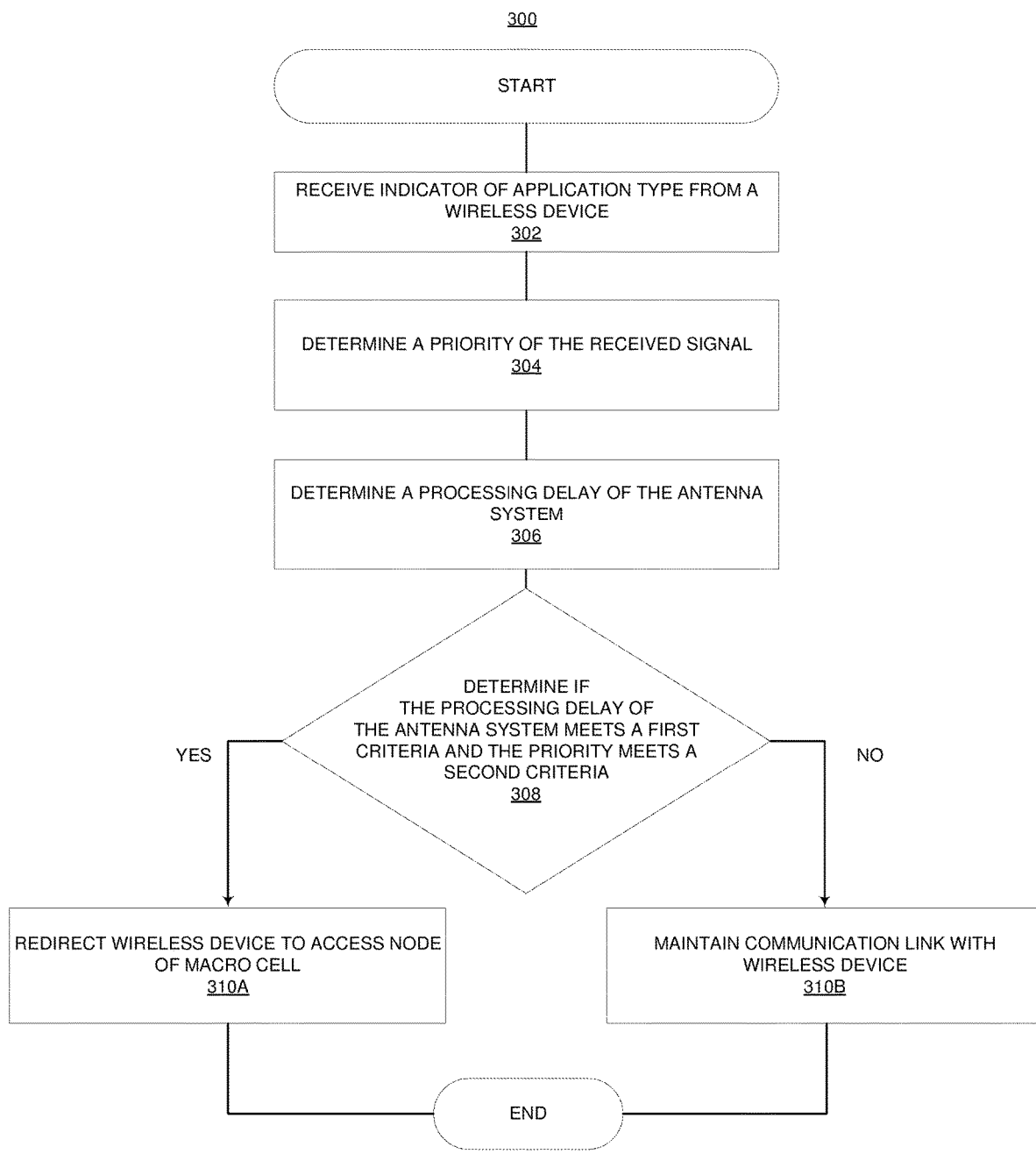
FIG. 3 is a method of controlling a network according to an embodiment.

FIG. 3 depicts an embodiment of a method 300 for controlling a network based on a priority of an application type from a wireless device. According to an embodiment, the method 300 may include a method of controlling an antenna system based on a priority type of an application type of wireless device. The antenna system may be representative of antenna system 108 of FIG. 1 or node 210 of FIG. 2, however, embodiments are not limited thereto. For example, the antenna system may be a distributed antenna system (DAS). The method 300 may include balancing traffic in a wireless network.

In operation 302 of method 300, the antenna system may receive an indicator of application type from a wireless device. For example, the application type may be VoLTE, video streaming, online gaming, video calling, email messaging, or text messaging.

In operation 304, the antenna system may determine a priority of the received signal. The priority may be based on the application type. For example, the priority may be a quality of service (QoS) indicator for each application type.

In operation 306, the antenna system may determine a processing delay for processing the received signal. For example, the antenna system may determine a latency of converting a RF signal, received from a wireless device, into a digital signal. For example, the antenna system may determine a latency caused by a load on the antenna system. As an example, an increase on the load on the antenna system may result in an increase in the latency of the antenna system.

In operation 308, based on the priority of the processing delay of the antenna system and application type, the antenna system may determine whether the processing delay meets a first criteria and the priority meets a second criteria. As an example, the antenna system may determine the priority meets a first criteria if the priority is high. The priority may be high if the application type is sensitive to processing delays or latency. For example, VoLTE, video streaming, online gaming, or video calling may be application types sensitive to processing delays, or latency. As an example, the QoS indicator may indicate whether an application type is sensitive to processing delays or latency.

In operation 310A, the antenna system may redirect the wireless device to an access node of a macro cell in response to a determination that the processing delay of the antenna system meets the first criteria and priority of the application type meets the second criteria. As an example, the processing delay of the antenna system may meet a first criteria if the latency is high, and the application type may meet a second criteria if the application type of wireless device is sensitive to latency. For example, the processing delay of the antenna system may be greater than a processing delay of the access node of the macro cell. By redirecting the wireless device from the antenna system to the access node of the macro cell, VoLTE, video streaming, online gaming, and video calling experiences may be improved.

In operation 310B, the antenna system may maintain the communication link with the wireless device in response to a determination that the processing delay of the antenna system does not meet the first criteria, a priority of the application type does not meet the second criteria, or both criteria are not met. As an example, the antenna system may maintain a communication link with the wireless device in response to the processing delay of the antenna system being low, or the application type of wireless device not being sensitive to processing delays, or latency. For example, the processing delay of the antenna system may be lower than the processing delay of the access node of the macro cell, or the application type of the wireless device is not sensitive to latency. By maintaining the communication link between the wireless device and the antenna system, resources may not be wasted by unnecessary handovers to access nodes of macro cells.

Figure 4:
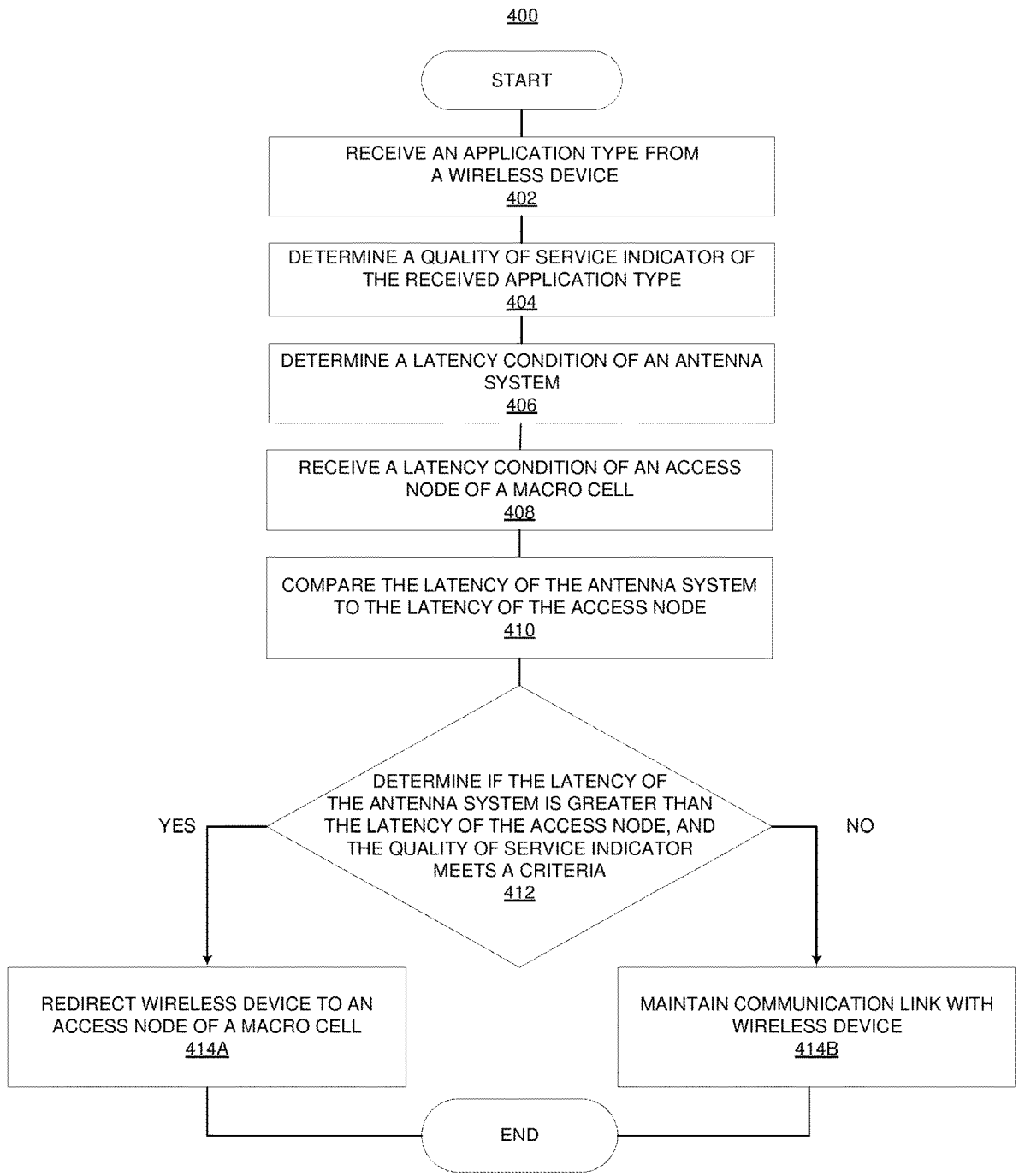
FIG. 4 is a method for controlling an antenna system according to an embodiment.

FIG. 4 depicts an embodiment of a method 400 for controlling an antenna system based on processing delay conditions of a distributed antenna system and an access node of a macro cell, and a priority of a received application type of a wireless device. For example, the antenna system, access node, and wireless device may be representative of the antenna system 108, access node 110, and wireless device 123 of FIG. 1, or node 210 and wireless devices of 221 and 222 of FIG. 2, however, embodiments are not limited thereto.

According to an embodiment, the method 400 may include redirecting a wireless device, based on a latency of an antenna system being greater than an access node of a macro cell in response to a priority of an application type of a wireless device meeting a criteria. The antenna system may maintain a communication link in response to a latency of the antenna system being less than a latency of the access node of a macro cell, or a priority of the application type of a wireless device not meeting a criteria.

For example, the antenna system may be a distributed antenna system (DAS). The antenna system may receive an application type from a wireless device. The antenna system may determine a quality of service indicator of the received application type. The antenna system may determine a latency condition of the antenna system. The antenna system may receive a latency condition of an access node. The antenna system may compare the latency of the antenna system with the latency of the node. Based on the latency of the antenna system being greater than the latency of the access node, and the quality of service indicator, the antenna system may determine whether to redirect the wireless device to the access node.

In operation 402 of method 400, the antenna system receives an application type from a wireless device. For example, the antenna system may be a DAS. As an example, the application type may be may be VoLTE, video streaming, online gaming, video calling, email messaging, or text messaging.

In operation 404, the antenna system may determine a quality of service (QoS) indicator of the received application type. As an example, the QoS indicator may be based on application types sensitive to processing delays, or latency. For example, VoLTE, video streaming, online gaming, and video calling may be examples of application types sensitive to processing delays, or latency.

In operation 406, a latency condition of the antenna system may be determined. As an example, the antenna system may determine the latency condition. For example, the latency condition may be based on a processing delay due to converting a RF signal received from a wireless device into a digital signal, or traffic load on the antenna system.

In operation 408, the antenna system may receive a latency condition of an access node of a macro cell. As an example, the antenna system may receive the latency condition based on a scan of one or more access nodes. Based on the scan, the antenna system may determine a processing delay of one or more access nodes. For example, the latency condition may be based on a processing delay due to converting a RF signal received from wireless devices into a digital signals, or traffic load on the access node.

In operation 410, the antenna system may compare the latency of the antenna system to the latency of the access node. For example, the antenna system may compare the latency of the antenna system to the determined processing delay of one or more access nodes.

In operation 412, the antenna system may determine if the latency of the antenna system is greater than the latency of the access node, and if the QoS indicator meets a criteria. For example, based on the comparison of the latencies of the antenna system and one or more access nodes, the antenna system may determine whether the latency of the antenna system is greater than a latency of one or more access nodes. The antenna system may further determine the QoS indicator meets a criteria if the application type is sensitive a latency or processing dely. For example, the QoS indicator correspond to application types that are sensitive to latency, for example, VoLTE, video streaming, online gaming, and video calling.

In operation 414A, in response to a determination that the latency of the antenna system is greater than the latency of the access node and the QoS indicator meets a criteria, the antenna system may redirect the wireless device to the access node. As an example, access node may be an access node of a macro cell. For example, the access node may have the lowest latency among the one or more access nodes. As an example, the directing of the wireless device may be by a hand over or cell reselection operation.

In operation 414B, in response to a determination that the latency of the antenna system is less than the latency of the access node or the QoS indicator does not meet a criteria, the antenna system may maintain a communication link with the wireless device. For example, the antenna system may have a lower latency than the one or more access nodes, or the application type is not sensitive to latency.

Figure 5:
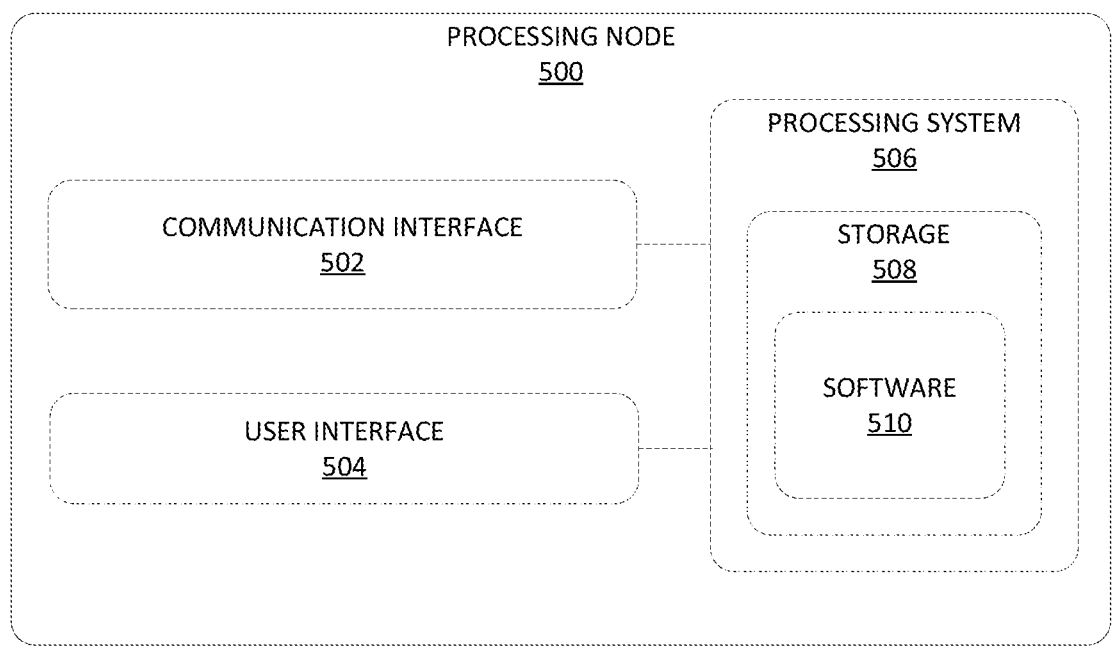
FIG. 5 is a diagram illustrating a processing node for balancing traffic in a wireless network according to an embodiment.

FIG. 5 depicts an embodiment of a processing node for data transmission using frame reconfiguration comprising a communication interface 502, user interface 504, and processing system 506 in communication with communication interface 502 and user interface 504. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. For example, storage 508 may include a buffer. Software 510 may include computer programs, firmware, or some other form of machine-readable instructions, including an operating system, utilities, drivers, network interfaces, applications, or some other type of software. For example, software 510 may include a coherence determination module. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

The example systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmit paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for balancing traffic in a wireless network, the method comprising:
   receiving an indicator of an application type from a wireless device communicating with a distributed antenna system;
   determining a processing delay of the distributed antenna system;
   determining a priority of a received signal based on the received indicator of the application type from the wireless device; and
   in response to the processing delay of the distributed antenna system meeting a first criteria and the priority meeting a second criteria, directing the wireless device to communicate with an access node.

2. The method of claim 1, further comprising scanning for an access node having a lower processing delay than the distributed antenna system.

3. The method of claim 1, wherein directing the wireless device to communicate with the access node comprises handing over the wireless device or cell reselection.

4. The method of claim 3, wherein, prior to directing, scanning and then determining a processing delay of one or more access nodes.

5. The method of claim 1, wherein the priority is based on a quality of service condition.

6. The method of claim 1, wherein in response to the processing delay of the distributed antenna system being less than the processing delay of the access node, directing the wireless device to communicate with the distributed antenna system.

7. The method of claim 1, wherein the priority corresponds to a quality of service indicator for the application type meeting a third criteria.

8. The method of claim 1, wherein the second criteria corresponds to VoLTE, video streaming, gaming, or video calling.

9. The method of claim 1, wherein the first criteria corresponds to the processing delay of the antenna system and a processing delay of an access node.

10. The method of claim 1, wherein the first criteria is met when the processing delay of the antenna system is greater than a processing delay of an access node.

11. The method of claim 1, wherein the determining the priority further comprises detecting a packet type.

12. The method of claim 11, wherein detecting a packet type comprises deep packet inspection.

13. A method for controlling a distributed antenna system, the method comprising:
   receiving an application type from a wireless device;
   determining a quality of service indicator of the received application type;
   determining a latency condition of the distributed antenna system;
   receiving a latency condition of an access node;
   comparing the latency condition of the access node to the latency condition of the distributed antenna system; and
   in response to the latency of the distributed antenna system being greater than the latency of the access node and the quality of service indicator meeting a criteria, directing the wireless device to communicate with the access node.

14. The method of claim 13, wherein the criteria corresponds to VoLTE, video streaming, gaming, or video calling.

15. The method of claim 13, further comprising scanning for an access node having a lower latency than the distributed antenna system.

16. The method of claim 13, wherein the determining the quality of service indicator further comprises detecting a packet type.

17. The method of claim 16, wherein detecting a packet type comprises deep packet inspection.

18. A wireless network system comprising:
   a distributed antenna system having a first latency; and
   an access node having a second latency;
   wherein the distributed antenna system is configured to:
      receive a signal from a wireless device;
      determine a quality of service indicator from the received signal;
      monitor the first latency and the second latency;
      compare the first latency to the second latency; and redirect the wireless device to communicate with the access node in response to the first latency being greater than the second latency and the quality of service indicator meeting a criteria.

19. The system of claim 18, wherein the criteria corresponds to VoLTE, video streaming, gaming, or video calling.

20. The system of claim 18, wherein the system is configured to perform deep packet inspection of a data packet of the received signal to determine a quality of service indication.

* * * * *